United States Patent
Takahashi et al.

(10) Patent No.: US 8,537,756 B2
(45) Date of Patent: Sep. 17, 2013

(54) RADIO BASE STATION AND MOBILE COMMUNICATION METHOD

(75) Inventors: Hideaki Takahashi, Yokohama (JP); Hiroyuki Ishii, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 122 days.

(21) Appl. No.: 13/148,528

(22) PCT Filed: Feb. 4, 2010

(86) PCT No.: PCT/JP2010/051608
§ 371 (c)(1),
(2), (4) Date: Jan. 10, 2012

(87) PCT Pub. No.: WO2010/090256
PCT Pub. Date: Aug. 12, 2010

(65) Prior Publication Data
US 2012/0106467 A1    May 3, 2012

(30) Foreign Application Priority Data
Feb. 9, 2009 (JP) ................................. 2009-027800

(51) Int. Cl.
*H04W 4/00* (2009.01)
(52) U.S. Cl.
USPC ........................................................ 370/328
(58) Field of Classification Search
USPC ................. 370/311–312, 320, 328–339, 342, 370/441; 455/403, 422.1, 550.1
See application file for complete search history.

(56) References Cited

U.S. PATENT DOCUMENTS 7,848,346 B2 * 12/2010 Park et al. ..................... 370/448
8,432,812 B2 *  4/2013 Park et al. ..................... 370/236

FOREIGN PATENT DOCUMENTS

EP       1 973 281 A2    9/2008
JP       2008-211585 A   9/2008

OTHER PUBLICATIONS

MAC Rapporteurs, et al., "RACH uniform random backoff," 3GPP TSG-RAN WG2 #62bis, R2-083382, Jun. 30-Jul. 4, 2008, 4 pages.
3GPP TS 36.321 V8.7.0, Sep. 2009, "3rd Generation Partnership Project; Technical Specification Group Radio Access Network; Evolved Universal Terrestrial Radio Access (E-UTRA) Medium Access Control (MAC) protocol specification, Release 8," 47 pages.
3GPP TS 36.321 V9.0.0, Sep. 2009, "3rd Generation Partnership Project; Technical Specification Group Radio Access Network; Evolved Universal Terrestrial Radio Access (E-UTRA) Medium Access Control (MAC) protocol specification, Release 9," 47 pages.
3GPP TS 36.300 V8.7.0, Dec. 2008, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 144 pages.
International Search Report issued in PCT/JP2010/051608, mailed on Apr. 13, 2010, with translation, 3 pages.
Written Opinion issued in PCT/JP2010/051608, mailed on Apr. 13, 2010, 3 pages.

* cited by examiner

*Primary Examiner* — Frank Duong
(74) *Attorney, Agent, or Firm* — Osha Liang LLP

(57) ABSTRACT

A radio base station (eNB) according to the present invention includes: a Back-off Indicator transmission unit (14) configured to transmit a Back-off Indicator notifying a Back-off value when a usage situation of an RA preamble satisfies a predetermined condition, in a random access procedure, wherein the Back-off value is a value relating to a timing of transmitting the RA preamble in a mobile station (UE).

6 Claims, 3 Drawing Sheets

| INDEX | BACK-OFF VALUE (MS) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |

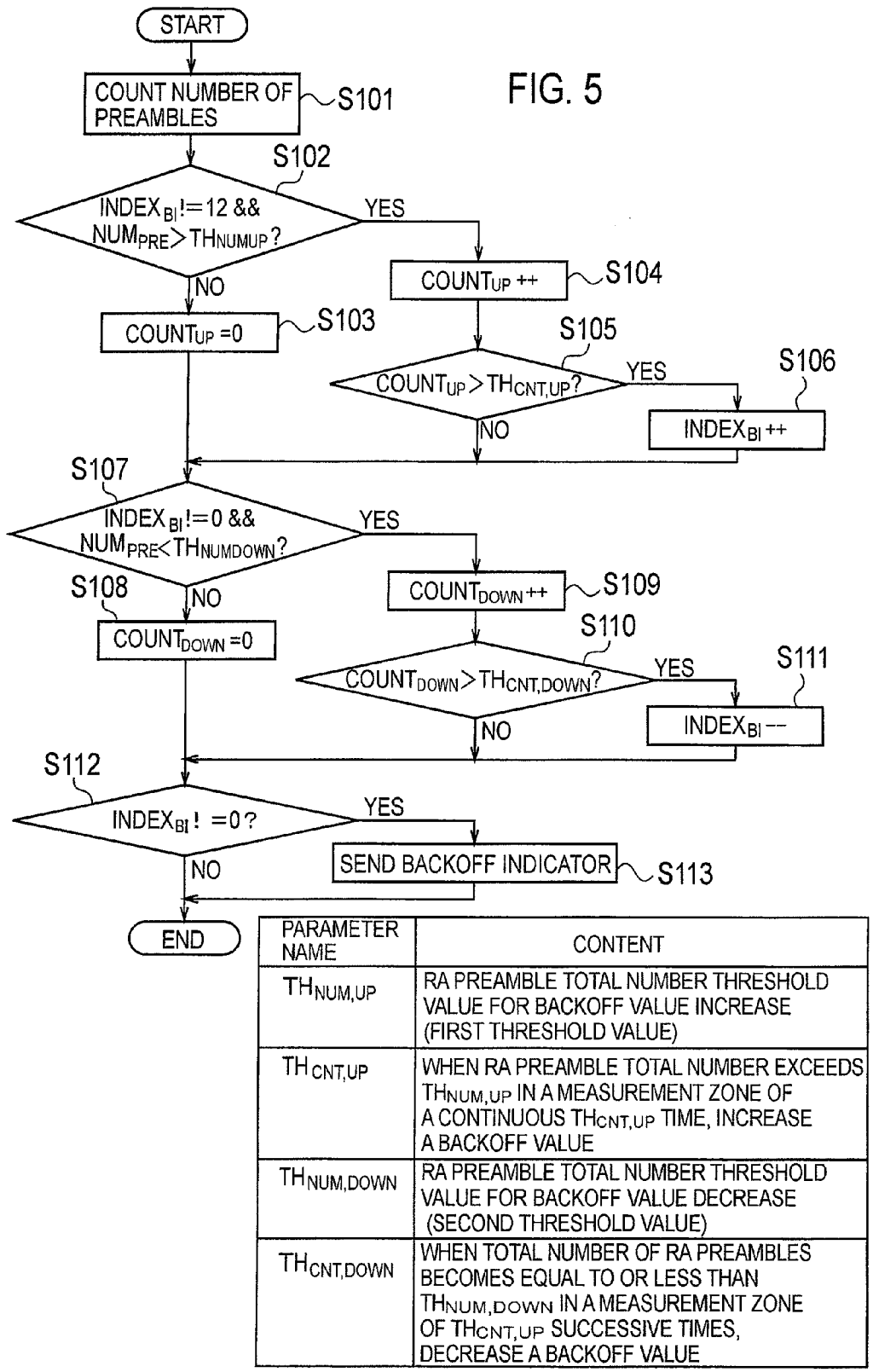

RADIO BASE STATION AND MOBILE COMMUNICATION METHOD

BACKGROUND OF INVENTION

1. Technical Field

The present invention relates to a radio base station and a mobile communication method.

2. Background Art

A mobile communication system of the LTE (Long Term Evolution) scheme is configured such that a mobile station UE transmits an RA (Random Access) preamble via a PRACH (Physical Random Access Channel) in order to start a random access procedure performed at a start of communication.

However, the above-mentioned mobile communication system has a problem that when a plurality of mobile stations UE visit a same cell, for example, RA preambles simultaneously transmitted by the plurality of mobile stations UE collide, and thus, a success probability of a random access procedure is lowered.

SUMMARY OF INVENTION

Therefore, the present invention is intended to overcome the above-described problem. An object of the present invention is to provide a radio base station and a mobile communication method, capable of increasing a success probability of a random access procedure.

A first aspect of the present invention is summarized as a radio base station, including: a Back-off Indicator transmission unit configured to transmit a Back-off Indicator notifying a Back-off value when a usage situation of a random access preamble satisfies a predetermined condition, in a random access procedure, wherein the Back-off value is a value relating to a timing of transmitting the random access preamble in a mobile station.

A second aspect of the present invention is summarized as a mobile communication method, including the steps of: (A) transmitting, from a radio base station, a Back-off Indicator notifying a Back-off value, when a usage situation of a random access preamble satisfies a predetermined condition, in a random access procedure; and (B) adjusting, at the mobile station, a timing of transmitting the random access preamble based on the Back-off value.

As explained above, according to the present invention, it is possible to provide a radio base station and a mobile communication method, capable of increasing a success probability of a random access procedure.

BRIEF DESCRIPTION OF THE DRAWINGS

FIG. 5 is a flowchart illustrating an operation of the radio base station according to the first embodiment of the present invention.

DETAILED DESCRIPTION (Mobile Communication System According to First Embodiment of the Present Invention)

Figure 1:
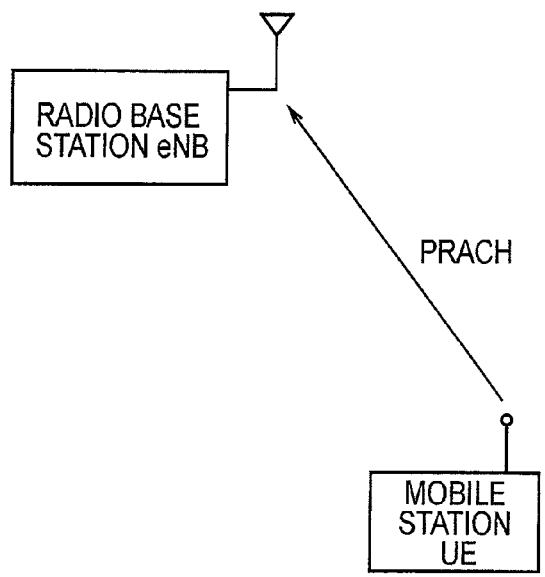
FIG. 1 is a diagram showing the entire configuration of a mobile communication system according to a first embodiment of the present invention.
Figure 2:
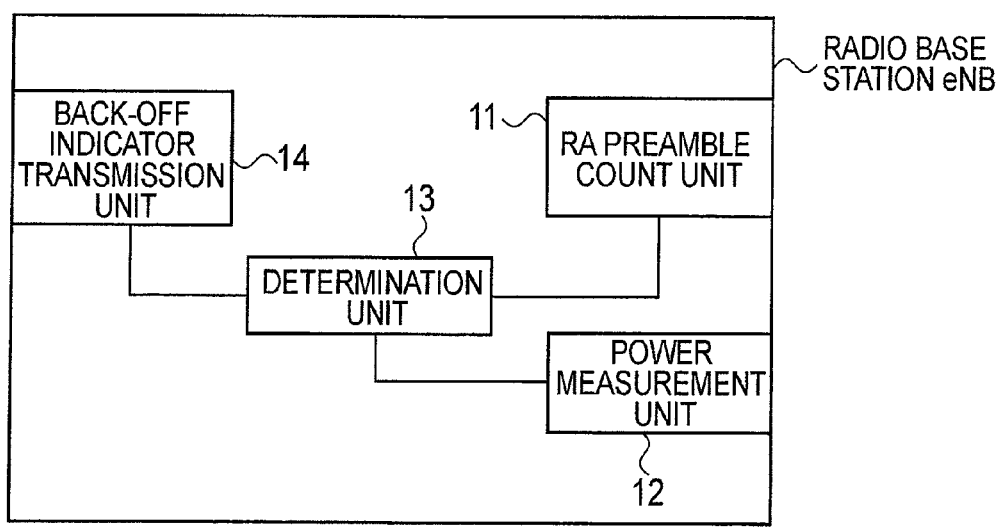
FIG. 2 is a functional block diagram of a radio base station according to the first embodiment of the present invention.
Figures 3, 4:
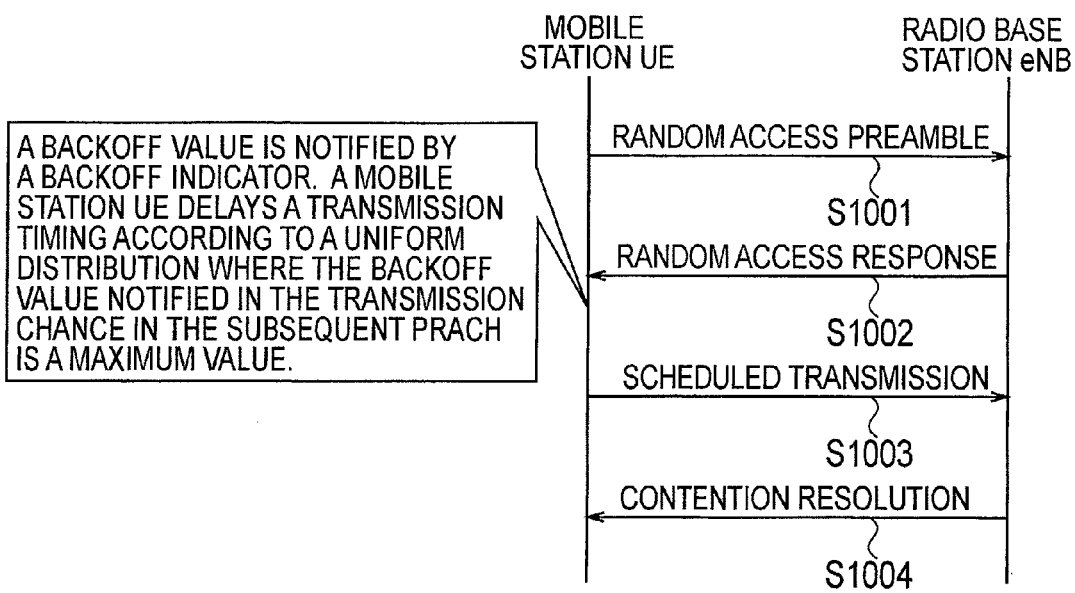
FIG. 3 is a diagram illustrating one example of a Back-off value transmitted by the radio base station according to the first embodiment of the present invention.
FIG. 4 is a sequence diagram illustrating an operation of a mobile communication system according to the first embodiment of the present invention.

With reference to FIG. 1 to FIG. 3, a mobile communication system according to a first embodiment of the present invention will be explained.

The mobile communication system according to this embodiment is a mobile communication system of the LTE scheme, and in the mobile communication system according to this embodiment, a mobile station UE is configured to transmit an RA preamble to a radio base station eNB via a PRACH in order to start a random access procedure, as illustrated in FIG. 1.

As illustrated in FIG. 2, the radio base station eNB according to this embodiment includes an RA preamble count unit 11, a power measurement unit 12, a determination unit 13, and a Back-off Indicator transmission unit 14.

The RA preamble count unit 11 is configured to count a total number of RA preambles received from the mobile station UE within each measurement period.

The power measurement unit 12 is configured to measure a received power, an interference power, SINR (Signal to Interference plus Noise power ratio), or Es/N0 (Energy per symbol per Noise spectral density), in a PRACH.

The determination unit 13 is configured to determine as to whether or not a usage situation of the random access preamble satisfies a predetermined condition, e.g., as to whether or not a total number $Num_{pre}$ of RA preambles received from the mobile station UE within all measurement periods of a continuous first predetermined number $Th_{CNT,UP}$ exceeds a first threshold value $Th_{NUMUP}$, or as to whether or not a total number $Num_{pre}$ of RA preambles received from the mobile station UE within all measurement periods of a continuous second predetermined number $Th_{CNT,DOWN}$ is equal to or less than a second threshold value $Th_{NUMDOWN}$.

Alternately, the determination unit 13 may be configured to determine as to whether or not the usage situation of the random access preamble satisfies a predetermined condition, e.g., whether or not at least one of a received power in PRACH, an interference power, SINR, and Es/N0 is larger or smaller than a predetermined threshold value.

The Back-off Indicator transmission unit 14 is configured to transmit a Back-off Indicator that notifies a Back-off value, when the usage situation of the RA preamble satisfies a predetermined condition, in the random access procedure.

In this case, the Back-off value is a value relating to a timing of transmitting the RA preamble in the mobile station UE, e.g., can be a value of "0" to "960 (ms)", as illustrated in FIG. 3.

For example, the Back-off Indicator transmission unit 14 is configured to increase the Back-off value to be notified, when the total number $Num_{pre}$ of the RA preambles received from the mobile station UE within all the measurement periods of the continuous first predetermined number $Th_{CNT,UP}$ exceeds the first threshold value $Th_{NUMUP}$.

That is, the Back-off Indicator transmission unit 14 is configured to transmit a Back-off Indicator including a Back-off value that is larger than the Back-off value notified last time, when the total number $Num_{pre}$ of the RA preambles received from the mobile station UE within all the measurement periods of the continuous first predetermined number $Th_{CNT,UP}$ exceeds the first threshold value $Th_{NUMUP}$.

Further, the Back-off Indicator transmission unit 14 may be configured to decrease the Back-off value to be notified, when the total number $Num_{pre}$ of the RA preambles received from the mobile station UE within all the measurement periods of the continuous second predetermined number $Th_{CNT,DOWN}$ is equal to or less than the second threshold value $Th_{NUMDOWN}$.

That is, the Back-off Indicator transmission unit 14 is configured to transmit a Back-off Indicator including a Back-off value that is smaller than the Back-off value notified last time, when the total number $Num_{pre}$ of the RA preambles received from the mobile station UE within all the measurement periods of the continuous second predetermined number $Th_{CNT,DOWN}$ is equal to or less than the second threshold value $Th_{NUMDOWN}$.

It is noted that the Back-off Indicator transmission unit 14 may be configured not to transmit a Back-off Indicator, when the Back-off value to be notified is 0.

For example, the Back-off Indicator transmission unit 14 may be configured to transmit a Back-off Indicator including "Index" illustrated in FIG. 3. Therefore, the Back-off Indicator transmission unit 14 may be configured not to transmit a Back-off Indicator including "Index"="0".

Moreover, the Back-off Indicator transmission unit 14 may be configured to transmit a Back-off Indicator by an RA response.

(Operation of Mobile Communication System According to First Embodiment of the Present Invention)

With reference to FIG. 4 and FIG. 5, the operation of the mobile communication system according to the first embodiment of the present invention will be explained.

As illustrated in FIG. 4, in step S1001, upon starting the random access procedure, the mobile station UE transmits the RA preamble (Random Access Preamble) to the radio base station eNB via a PRACH.

In step S1002, the radio base station eNB transmits an RA response (Random Access Response) to the mobile station UE, in response to the received RA preamble.

In this case, the radio base station eNB determines whether or not to transmit a Back-off Indicator by the RA response. Such a determination operation will be explained with reference to FIG. 5, below.

As illustrated in FIG. 5, in step S101, the radio base station eNB counts the total number $Num_{pre}$ of the RA preambles received within a certain measurement period.

In step S102, the radio base station eNB determines whether or not "Index (hereinafter, $Index_{BI}$)" indicating a Back-off Indicator is not "12" and the total number $Num_{pre}$ of the RA preambles is larger than the first threshold value $Th_{NUMUP}$.

When "$Index_{BI}$" is not "12" and the total number $Num_{pre}$ of the RA preambles is larger than the first threshold value $Th_{NUMUP}$, the radio base station eNB performs a process (CountUP++) of incrementing a counter $Count_{UP}$ in step S104, and then, proceeds to a process in step S105.

On the other hand, when "$Index_{BI}$" is "12" or the total number $Num_{pre}$ of the RA preambles is not larger than the first threshold value $Th_{NUMUP}$, the radio base station eNB performs a process (CountUP=0) of initializing the counter $Count_{UP}$ in step S103, and then proceeds to step S107.

In step S105, the radio base station eNB determines whether or not the counter $Count_{UP}$ is larger than a threshold value (first predetermined number) $Th_{CNT,UP}$. When the counter $Count_{UP}$ is larger than a threshold value $Th_{CNT,UP}$ the radio base station eNB performs a process ($Index_{BI}$++) of incrementing "$Index_{BI}$", and then proceeds to step S107. On the other hand, when the counter $Count_{UP}$ is not larger than the threshold value $Th_{CNT,UP}$, the radio base station eNB proceeds to step S107.

In step S107, the radio base station eNB determines whether or not "$Index_{BI}$" is not "0" and the total number $Num_{pre}$ of the RA preambles is smaller than a second threshold value $Th_{NUMDOWN}$.

When "$Index_{BI}$" is not "0" and the total number $Num_{pre}$ of the RA preambles is smaller than the second threshold value $Th_{NUMDOWN}$, the radio base station eNB performs a process (CountDOWN++) of incrementing a counter $Count_{DOWN}$ in step S109, and then proceeds to a process in step S110.

On the other hand, when "$Index_{BI}$" is "0" or the total number $Num_{pre}$ of the RA preambles is not smaller than the second threshold value $Th_{NUMDOWN}$, the radio base station eNB performs a process (CountDOWN=0) of initializing the counter $Count_{DOWN}$ in step S108, and then, proceeds to step S112.

In step S110, the radio base station eNB determines whether or not the counter $Count_{DOWN}$ is larger than a threshold value (second predetermined number) $Th_{CNT,DOWN}$. When the counter $Count_{DOWN}$ is larger than the threshold value $Th_{CNT,DOWN}$, the radio base station eNB performs a process ($Index_{BI}$--) of decrementing "$Index_{BI}$", and then, proceeds to step S112. In step S112, the radio base station eNB determines whether or not "$Index_{BI}$" is not "0".

When "$Index_{BI}$" is not "0", in step S113, the radio base station eNB determines that a Back-off Indicator including the Back-off value corresponding to the present "$Index_{BI}$" should be transmitted.

On the other hand, when "$Index_{BI}$" is "0", the radio base station eNB determines that a Back-off Indicator including the Back-off value should be not transmitted.

Next, returning to FIG. 4, upon receipt of a Back-off Indicator, the mobile station UE delays the timing of transmitting predetermined information (e.g., RA preamble and Scheduled Transmission) in the subsequent PRACH according to a uniform distribution where the Back-off value to be notified is the maximum value.

In step S1003, the mobile station UE transmits Scheduled Transmission to the radio base station eNB via a PRACH.

In this case, upon receipt of a Back-off Indicator, the mobile station UE transmits Scheduled Transmission at a transmission timing determined based on the Back-off value. It is noted that upon receipt of a Back-off Indicator, the mobile station UE can transmit Scheduled Transmission at a desired transmission timing.

In step S1004, responding to the received Scheduled Transmission, the radio base station eNB transmits Contention Resolution to the mobile station UE.

(Operation and Effect of the Mobile Communication System According to the First Embodiment of the Present Invention)

According to the mobile communication system based on the first embodiment of the present invention, it is possible to increase the success probability of the random access procedure by dispersing, at a congestion time, etc. the timings of transmitting the predetermined information (e.g., the RA preamble and Scheduled Transmission) in PRACH by each mobile station UE.

The above-mentioned aspect of the embodiment may be expressed as follows:

A first aspect of this embodiment is summarized as a radio base station eNB including: a Back-off Indicator transmission unit 14 configured to transmit a Back-off Indicator notifying a Back-off value when a usage situation of an RA preamble satisfies a predetermined condition, in a random access procedure, in which the Back-off value is a value relating to a timing of transmitting the RA preamble in a mobile station UE.

In the first aspect of this embodiment, as the usage situation of the RA preamble, at least one of a total number $Num_{pre}$ of the RA preambles received from the mobile station UE within a measurement period, a received power in PRACH by which the RA preamble is transmitted, an interference power in PRACH, and SINR or Es/N0, in a PRACH may be used.

In the first aspect of this embodiment, the Back-off Indicator transmission unit 14 may be configured to increase a Back-off value to be notified, when the total number $Num_{pre}$ of the RA preambles received from the mobile station UE within all the measurement periods of a continuous first predetermined number $Th_{CNT,UP}$ exceeds a first threshold value $Th_{NUMUP}$, and the Back-off Indicator transmission unit 14 may be configured to decrease the Back-off value to be notified, when the total number $Num_{pre}$ of the RA preambles received from the mobile station UE within all the measurement periods of a continuous second predetermined number $Th_{CNT,DOWN}$ is equal to or less than a second threshold value $Th_{NUMDOWN}$.

In the first aspect of this embodiment, the Back-off Indicator transmission unit 14 may be configured not to transmit the Back-off Indicator, when the Back-off value to be notified is 0.

A second aspect of this embodiment is summarized as a mobile communication method including the steps of: (A) transmitting, from a radio base station eNB, a Back-off Indicator notifying a Back-off value, when a usage situation of an RA preamble satisfies a predetermined condition, in a random access procedure, and (B) adjusting, at a mobile station UE, a timing of transmitting the RA preamble based on the Back-off value.

In the second aspect of this embodiment, as the usage situation of the RA preamble, at least one of a total number of the RA preambles received from the mobile station UE within a measurement period, a received power in PRACH by which the RA preamble is transmitted, an interference power in PRACH, and SINR or Es/N0, in a PRACH may be used.

In the second aspect of this embodiment, in the step (A), the radio base station eNB may increase a Back-off value to be notified, when the total number $Num_{pre}$ of the RA preambles received from the mobile station UE within all the measurement periods of a continuous first predetermined number $Th_{CNT,UP}$ exceeds a first threshold number $Th_{NUMUP}$, and in the step (A), the radio base station eNB may decrease the Back-off value to be notified, when the total number $Num_{pre}$ of the RA preambles received from the mobile station UE within all the measurement periods of a continuous second predetermined number $Th_{CNT,DOWN}$ is equal to or less than a second threshold value $Th_{NUMDOWN}$.

In the second aspect of this embodiment, in the step (A), the radio base station eNB may not transmit the Back-off Indicator, when the Back-off value to be notified is 0.

The operation of the above-described radio base station eNB and the mobile station UE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB and the mobile station UE. As a discrete component, such a storing medium and processor may be arranged in the radio base station eNB and the mobile station UE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station, comprising:
a Back-off Indicator transmission unit configured to transmit a Back-off Indicator notifying a Back-off value when a usage situation of a random access preamble satisfies a predetermined condition, in a random access procedure, wherein
the Back-off value is a value relating to a timing of transmitting the random access preamble in a mobile station,
the Back-off Indicator transmission unit is configured to increase a Back-off value to be notified, when a total number of random access preambles received from the mobile station within all the measurement periods of a continuous first predetermined number exceeds a first threshold value, and
the Back-off Indicator transmission unit is configured to decrease the Back-off value to be notified, when a total number of random access preambles received from the mobile station within all the measurement periods of a continuous second predetermined number is equal to or less than a second threshold value.

2. The radio base station according to claim 1, wherein
as the usage situation of the random access preamble, at least one of a total number of the random access preambles received from the mobile station within a measurement period, a received power in a physical random access channel by which the random access preamble is transmitted, an interference power in the physical random access channel, and SINR or Es/N0, in the physical random access channel is used.

3. The radio base station according to claim 1, wherein
the Back-off Indicator transmission unit is configured not to transmit the Back-off Indicator, when the Back-off value to be notified is 0.

4. A mobile communication method, comprising the steps of:
(A) transmitting, from a radio base station, a Back-off Indicator notifying a Back-off value, when a usage situation of a random access preamble satisfies a predetermined condition, in a random access procedure; and
(B) adjusting, at the mobile station, a timing of transmitting the random access preamble based on the Back-off value, wherein
in the step (A), the radio base station increases the Back-off value to be notified, when a total number of random access preambles received from the mobile station within all the measurement periods of a continuous first predetermined number exceeds a first threshold value, and
in the step (A), the radio base station decreases the Back-off value to be notified, when a total number of random access preambles received from the mobile station within all the measurement periods of a continuous second predetermined number is equal to or less than a second threshold value.

5. The mobile communication method according to claim 4, wherein as the usage situation of the random access preamble, at least one of a total number of the random access preambles received from the mobile station within a measurement period, a received power in a physical random access channel by which the random access preamble is transmitted, an interference power in the physical random access channel, and SINR or Es/N0 in the physical random access channel is used.

6. The mobile communication method according to claim 4, wherein in the step (A), the radio base station does not transmit the Back-off Indicator, when the Back-off value to be notified is 0.

* * * * *